(12) United States Patent
Watson

(10) Patent No.: US 9,803,698 B2
(45) Date of Patent: Oct. 31, 2017

(54) SYSTEM AND METHOD HAVING COUPLING WITH LAYERED PORTION

(71) Applicant: GENERAL ELECTRIC COMPANY, Schenectady, NY (US)

(72) Inventor: Peter Watson, Bayern (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/709,370

(22) Filed: May 11, 2015

(65) Prior Publication Data

US 2016/0333942 A1    Nov. 17, 2016

(51) Int. Cl.
*F16D 3/76* (2006.01)
*F16D 3/12* (2006.01)
*F16F 1/387* (2006.01)

(52) U.S. Cl.
CPC ............. *F16D 3/76* (2013.01); *F16D 3/12* (2013.01); *F16F 1/3876* (2013.01); *F16D 2250/00* (2013.01)

(58) Field of Classification Search
CPC ........... F16D 3/12; F16D 3/76; F16D 2250/00
USPC ................................. 464/75, 89–91
See application file for complete search history.

(56) References Cited

U.S. PATENT DOCUMENTS

| | | | | |
|---|---|---|---|---|
| 2,995,907 A | * | 8/1961 | Orain | F16D 3/76 464/90 X |
| 3,020,036 A | * | 2/1962 | Kleinschmidt | F16D 3/76 464/90 X |
| 5,573,463 A | * | 11/1996 | Arlt | F16D 3/76 464/90 X |
| 5,660,591 A | | 8/1997 | Reynolds | |
| 7,625,290 B2 | * | 12/2009 | Hodjat | F16D 3/68 464/75 |

FOREIGN PATENT DOCUMENTS

| | | |
|---|---|---|
| DE | 4312577 C1 | 8/1994 |
| DE | 102004002739 A1 | 8/2005 |
| GB | 562171 * | 6/1944 |
| GB | 1490253 A | 10/1977 |
| WO | 2008005494 A1 | 1/2008 |

OTHER PUBLICATIONS

European Search Report; EP Application No. EP16168872; dated Sep. 8, 2016.

* cited by examiner

*Primary Examiner* — Gregory Binda
(74) *Attorney, Agent, or Firm* — Fletcher Yoder, P.C.

(57) ABSTRACT

A system includes a rotational coupling including a first rotational joint, a second rotational joint, and a coupling body disposed between the first and second rotational joints. The coupling body includes first and second body portions disposed about a rotational axis, and a layered portion disposed about the rotational axis radially between the first and second body portions. The layered portion includes first and second elastomeric portions disposed about the rotational axis, and a rigid portion disposed about the rotational axis radially between the first and second elastomeric portions. The rigid portion includes a plurality of radial protrusions.

21 Claims, 11 Drawing Sheets

SYSTEM AND METHOD HAVING COUPLING WITH LAYERED PORTION

BACKGROUND OF THE INVENTION

The subject matter disclosed herein relates to a mechanical coupling, and, more particularly to a rotational coupling to transfer torque between machinery.

A rotational coupling may be used to transfer torque between a variety of machinery, such as an engine and a load. For example, a power generation system may include an engine (e.g., reciprocating engine or gas turbine) drivingly coupled to an electric generator. Depending on the configuration, the power generation system may produce between 100 kW and 10 MW or more of electricity. In such power generation systems and other heavy machinery, the rotational coupling may be susceptible to wear and/or degradation due to torque, vibration, shock, misalignment, thermal stress, and/or mechanical stress.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the present disclosure. Indeed, the present disclosure may encompass a variety of forms that may be similar to or different from the embodiments set forth below.

In a first embodiment, a system includes a rotational coupling including a first rotational joint, a second rotational joint, and a coupling body disposed between the first and second rotational joints. The coupling body includes first and second body portions disposed about a rotational axis, and a layered portion disposed about the rotational axis radially between the first and second body portions. The layered portion includes first and second elastomeric portions disposed about the rotational axis, and a rigid portion disposed about the rotational axis radially between the first and second elastomeric portions. The rigid portion includes a plurality of radial protrusions.

In a second embodiment, a system includes a coupling including a central axis, an inner body portion disposed about the central axis, an outer body portion disposed about the inner body portion, and a layered portion disposed about the central axis radially between the inner and outer body portions. The layered portion includes inner and outer elastomeric portions disposed about the central axis, and a rigid portion disposed about the central axis radially between the inner and outer elastomeric portions. The rigid portion includes a plurality of radial protrusions interfacing with the outer elastomeric portion.

In a third embodiment, a method includes transferring torque through a layered portion of a rotational coupling between first and second machines. The layered portion includes first and second elastomeric portions disposed about a rotational axis, and a rigid portion disposed about the rotational axis radially between the first and second elastomeric portions. The rigid portion includes a plurality of radial protrusions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
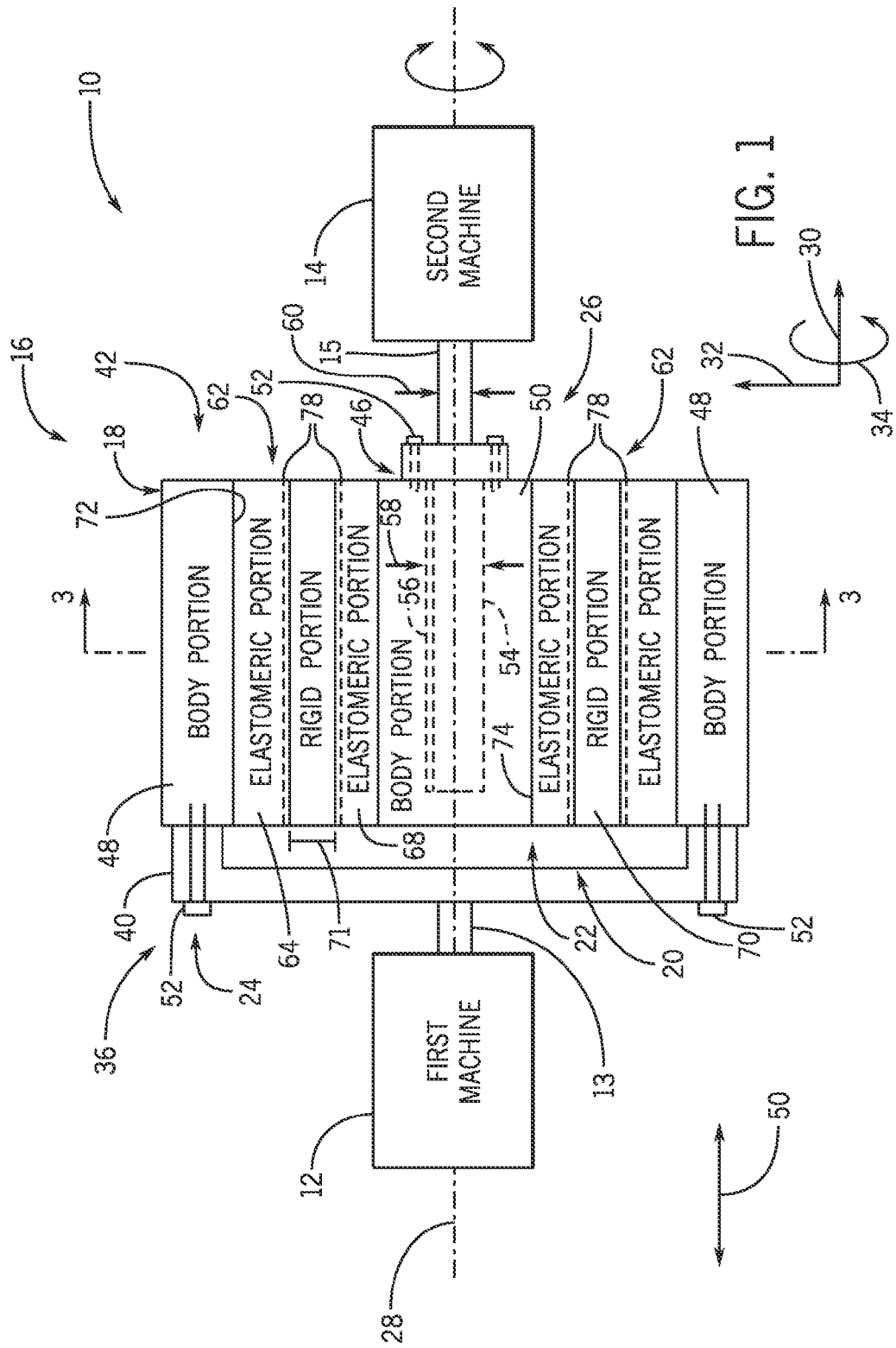
FIG. 1 is a block diagram of an embodiment of a machine system having a flexible in-shear coupling, wherein the flexible in-shear coupling includes a plurality of layers having at least one rigid layer between two resilient layers.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure relates to flexible couplings for transmitting torque between machinery, such as shafts of dual shaft power generation systems (e.g., engine-generator sets). For example, the flexible coupling may connect an engine shaft with a corresponding load shaft of a generator or gearbox. The flexible coupling includes a layered portion having a plurality of resilient portions (e.g., resilient material) disposed about a rigid portion (e.g., rigid material). The layered portion (e.g., toothed rigid material sandwiched between resilient material) may help to improve shaft alignment, damp vibration, absorb shock (e.g., due to sudden changes in torque and/or reversal in torque), reduce thermal stress, and reduce mechanical stress, while also transferring torque between machinery (e.g., engine to generator, or gearbox). For example, the resilient material may accommodate shaft misalignment, in particular, in engine-generator sets that include at least one resiliently mounted engine and/or generator, or gearbox. By further example, the resilient material in the flexible coupling may provide a cushion for vibrations associated with operation of the system, thereby damping the vibrations and mitigating noise, and not limited to engine-generator sets that include at least one resiliently mounted engine, generator, or gearbox and also applicable to rigidly mounted engine and rigidly mounted driven article.

Various types of couplings may incorporate a resilient material to transfer torque from one rotating shaft to an adjacent shaft. For example, flexible in-shear couplings, such as toothed type couplings and low radial/high flexibility couplings, transfer torque via shear forces. Other flexible couplings include flexible in-compression couplings, which transfer torque via compression forces. Properties of the resilient material in the flexible couplings may depend on the manner in which the flexible couplings transfers the torque (e.g., via compression or shear). For example, the resilient material used for flexible in-compression couplings may have a higher degree of torsional stiffness compared to the resilient material used for flexible in-shear couplings (e.g., elastomer in-shear couplings), which generally have a higher degree of torsional softness. Unlike flexible in-compression couplings, which transfer torque via compression, the resilient material in the flexible in-shear couplings stretches and twists during torque transfer. The stretching and twisting of the resilient material may result in areas of high stress load that may decrease the overall durability of the resilient material in the flexible in-shear couplings compared to the flexible in-compression couplings. For example, the high stress load, in combination with elevated system temperatures, may cause the resilient material to wear and breakdown (e.g., degrade), thereby decreasing system performance and reliability. As such, without the disclosed embodiments, flexible in-shear couplings may be replaced more frequently compared to flexible in-compression couplings, increasing equipment and maintenance costs, e.g., for dual shaft power generation systems that use flexible in-shear couplings for torque transfer. Accordingly, it may be desirable to configure a flexible in-shear coupling to locally load high stress areas in compression, rather than in shear, while maintaining the desired torsional softness of the resilient material. By locally loading areas of the flexible coupling sensitive to the shear load, the durability of the flexible in-shear coupling may be increased.

FIG. 1 illustrates a block diagram of a system 10 having first and second machines 12 and 14 coupled together with a rotational coupling 16 (e.g., resilient or flexible rotational coupling), wherein the rotational coupling 16 includes a coupling body 18 having a layered portion 20 with a plurality of layers 22 of alternating resilient and rigid materials in a sandwich arrangement (e.g., concentric layers). As discussed in detail below, the rotational coupling 16 may improve system durability, operability, and reliability by loading certain regions of the resilient material in compression, rather than in shear. As shown in FIG. 1, the rotational coupling 16 includes first and second rotational joints 24 and 26 coupled to respective shafts 13 and 15 of the first and second machines 12 and 14 to facilitate rotation about a rotational axis 28 (e.g., transfer power and torque). In certain embodiments, the first machine 12 provides power and/or transfers torque to drive the second machine 14, and thus the first machine 12 may include an engine or driving machine while the second machine 14 may include a load or driven machine. In certain embodiments, the second machine 14 provides power and/or transfers torque to drive the first machine 12, and thus the second machine 14 may include an engine or driving machine while the first machine 12 may include a load or driven machine.

The engine or driving machine (e.g., 12 or 14) may include, but is not limited to, a gas turbine, a steam turbine, a wind turbine, a hydro turbine, a reciprocating engine (discussed in detail below with reference to FIG. 2), an electric motor, or any combination thereof. The load or driven machine (e.g., 12 or 14) may include, but is not limited to, a vehicle or a stationary load. By way of example, the load or driven machine may include an electrical generator of a power generation system 10, a compressor, a pump, an industrial machine or automation system, a drivetrain of a vehicle, a propeller of an aircraft or watercraft, or any suitable device capable of being powered by the rotational output of the engine or driving machine.

As discussed above, the rotational coupling 16 links (e.g., connects) the shafts 13, 15 and transmits torque from the first shaft 13 to the second shaft 15 or vice versa, depending on which machines 12, 14 are driving and driven. In the following discussion, reference may be made to an axial axis or direction 30, a radial axis or direction 32, and/or a circumferential axis or direction 34 of the rotational coupling 16. In the illustrated embodiment, the first rotational joint 24 on a first side 36 of the rotational coupling 16 has a first hub 40 (e.g. a flywheel), while the second rotational joint 26 on a second side 42 has a second hub 46 (e.g., a flywheel). The first and second hubs 40, 46 may be driving and driven hubs or vice versa, depending on which machines 12, 14 are driving and driven. The first and second hubs 40, 46 are coupled to different body portions of the coupling body 18, such that the layered portion 20 with layers 22 is disposed between and thus transfers torque between the hubs 40, 46. For example, the rotational coupling 16 includes an outer body portion 48 (e.g., annular body portion) that couples to the hub 40, and an inner body portion 50 (e.g., annular or cylindrical body portion) that couples to the hub 46. The outer body portion 48 is disposed circumferentially 34 about the layered portion 20, the inner body portion 50 and at least a portion of the hub 46, the second shaft 15, or a combination thereof (e.g., in a coaxial or concentric arrangement). The inner body portion 50 is disposed circumferentially 34 about at least a portion of the hub 46, the second shaft 15, or a combination thereof (e.g., in a coaxial or concentric arrangement). The layered portion 20 with layers 22 is disposed radially 32 between the body portions 48, 50, such that the layered portion 20 is sandwiched between (and separates) the body portions 48, 50. As a result, the body portions 48, 50 do not directly couple to one another, and thus torque is not transferred directly between the body portions 48, 50. Instead, the torque transfers to one of the body portions (e.g., 48 or 50), through the layers 22 in the layered portion 20, and subsequently through the other of the body portions (e.g., 48 or 50), thereby enabling torque transfer between the machines 12, 14.

The rotational joints 24 and 26 may include a variety of couplings, such as threaded fasteners, male-female joints, clamps, flanges, interference fits, or any combination thereof. For example, the rotational joint 24 at the outer body portion 48 may include a plurality of fasteners 52 (e.g., threaded fasteners) securing the hub 40 to the outer body portion 48. By further example, the rotational joint 26 at the inner body portion 50 may include the hub 46 and an opening 54 (e.g., annular opening) that accommodates at least a portion of the hub 46 and/or the second shaft 15. For example, the annular opening 54 may have a radial dimension 58 that is greater than or equal to a shaft dimension 60. The rotational joint 26 may include an internal joint 56 within the opening 54, thereby internally securing the shaft 15 and/or the hub 46 within the opening 54 of the inner body portion 50. The internal joint 56 may include a male-female joint, such as a key in slot joint, a spline joint, or any combination thereof. Alternatively or additionally, the rotational joint 26 may include a plurality of fasteners 52 (e.g., threaded fasteners or bolts) securing the shaft 15 and/or the hub 46 to the inner body portion 50. In operation, if the machine 12 drives the machine 14, then torque may be transferred through the first rotational joint 24 to the outer body portion 48, sequentially through the layers 22 in the layered portion 20, and then out through the inner body portion 50. Alternatively, if the machine 14 drives the machine 12, then torque may be transferred through the second rotational joint 26 to the inner body portion 50, sequentially through the layers 22 in the layered portion 20, and then out through the outer body portion 48.

The body portions 48, 50 define an annular space 62 that supports the layered portion 20. The layered portion 20 in the annular space 62 is disposed circumferentially 34 about the inner body portion 50, and the outer body portion 48 is circumferentially 34 about the layered portion 20 in the annular space 62. The layered portion 20 includes a plurality of layers 22 disposed within the annular space 62 that facilitate torque transfer between the body portions 48, 50 and the shafts 13, 15. For example, in the illustrated embodiment, the layered portion 20 (e.g., annular layered portion) includes a first resilient portion 64 (e.g., first elastomeric portion), a second resilient portion 68 (e.g., second elastomeric portion), and a rigid portion 70. The resilient portions 64, 68 may be made of any resilient materials, such as, but not limited to, elastomeric materials. However, the following discussion will refer to the portions 64, 68 as elastomeric portions. The elastomeric portions 64, 68 are radially 32 spaced apart a distance 71 corresponding to a radial dimension of the rigid portion 70. That is, the rigid portion 70 is sandwiched between the elastomeric portions 64, 68. The first elastomeric portion 64 is radially 32 away from the inner body portion 50 and abuts a first inner surface 72 of the outer body portion 48 and the rigid portion 70. The second elastomeric portion 68 is radially 32 away from the outer body portion 48 and abuts a second inner surface 74 associated with the inner body portion 50 and the rigid portion 70. Accordingly, the first elastomeric portion 64 is circumferentially 34 about the inner body portion 50, the second elastomeric portion 68, and the rigid portion 70. The rigid portion 70 is circumferentially 34 about the inner body portion 50 and the second elastomeric portion 68. The second elastomeric portion 68 is circumferentially 34 about the inner body portion 50. In other words, the layered portion 20 has the first and second elastomeric portions 64, 68 disposed about the rotational axis 28, and the rigid portion 70 disposed about the rotational axis 28 radially 32 between the first and second elastomeric portions 64, 68.

The elastomeric portions 64, 68 have a desired torsional stiffness and torsional softness that enable the transfer of torque between the shafts 13, 15 via shear loading, allow a desired degree of misalignment of the shafts 13, 15, and mitigate vibrational noise during operation of the system 10. In certain embodiments, the resilient material (e.g., elastomeric material) in the elastomeric portions 64, 68 is the same. In other embodiments, the resilient material (e.g., elastomeric material) in each respective elastomeric portion 64, 68 is different. Non-limiting examples of the resilient material (e.g., elastomeric material) that may be used in the elastomeric portions 64, 68 include at least one of the following materials: natural rubber, acrylic rubber, butadiene rubber, butyl rubber, chloroprene, chlorinated polyethylene, ethylene-propylene-diene, fluorosilicone rubber, fluorocarbon rubber, nitrile rubber, polyethylene, polyvinyl chloride, polymethyl methacrylate, polybutadiene, polypropylene, polyisobutylene, polyurethane, polyvinyl acetate, polyisoprene, styrene butadiene, silicone rubber, urethane rubber, polymer composites, any other suitable resilient material, or combinations thereof. The resilient material may include additional components such as fillers (e.g., to enhance durability of the elastomeric material to exposure to ozone, or enhance durability and stiffness of the elastomeric material (e.g., affected by carbon black particle size and content) or overmoulded fibres (e.g., polyamide/nylon, or Kevlar, or a combination).

As discussed above, without the disclosed embodiments, the shear load between the rotational joints 24, 26 may create areas of high stress load on the resilient material (e.g., elastomeric material) due, in part, to stretching and twisting during torque transfer. For example, the resilient materials used for flexible in-shear couplings, such as the rotational coupling 16, may have a reduced hardness (e.g., torsional stiffness) compared to resilient materials used, for example, in flexible in-compression couplings. The reduced torsional stiffness of the resilient material for flexible in-shear couplings provides the desired flexibility to enable torque transfer via shear loading. However, the reduced torsional stiffness of the resilient material also results in areas of high shear stress during shear loading that may decrease the overall durability of the flexible in-shear coupling. Therefore, without the disclosed embodiments, the flexible in-shear couplings may be replaced frequently, resulting in increased maintenance and replacement costs for power generating (or pumping, or drive) system that use flexible in-shear couplings compared to systems that use flexible in-compression couplings to transfer torque.

To mitigate the undesirable effects of the shear load, the rigid portion 70 is interleafed between the elastomeric portions 64, 68 to create the layered portion 20 of the rotational coupling 16. The rigid portion 70 may include rigid materials such as, but not limited to, metals, metal alloys, glass-filled nylon, or other suitable reinforced composite materials (e.g., reinforcing materials distributed throughout a matrix material), and combinations thereof. For example, the composite materials may include a thermally conductive material (e.g., metal fibers) distributed in a conductive or non-conductive material, or non-conductive fibers distributed in a conductive matrix material. The rigid portion 70 may include surface features 78 (e.g., protrusions, recesses, teeth, etc.) that increase the durability of the elastomeric portions 64, 68. For example, as discussed in further detail below, with reference to FIGS. 3-9, the surface features 78 may load the shear forces in areas sensitive to shear degradation in compression. As should be noted, the rigid portion 70 may increase the stiffness of the elastomeric portions 64, 68. Therefore, the resilient material (e.g., elastomeric material) in the elastomeric portions 64, 68 may be compound tuned, e.g., in-part by adding carbon black to the elastomeric material to maintain a desired stiffness comparable to a flexible in-shear coupling that does not include the rigid portion 70.

In addition to relieving stress on the elastomeric portions 64, 68 caused by the shear load, the rigid material 70 may increase conductivity of the plurality of layers 22 to enhance cooling of the elastomeric portions 64, 68. For example, the elastomeric portions 64, 68 may not have sufficient thermal conductivity to dissipate the heat generated during operation of the system 10. Therefore, the temperature of the elastomeric portions 64, 68 may potentially increase to temperatures above desirable for a preferred elastomeric material (e.g., greater than approximately 90° C. in a natural rubber compound), which may result in thermal stress and degradation (e.g., breakdown) of the resilient materials having the torsional softness properties for flexible in-shear couplings. However, the rigid portion 70 may have a suitable thermal conductivity to dissipate the heat throughout the elastomeric portions 64, 68, such that the temperature of the elastomeric portions 64, 68 may be maintained at temperatures of approximately 90° C. (194° F.) or less during operation of the system 10.

Figure 2:
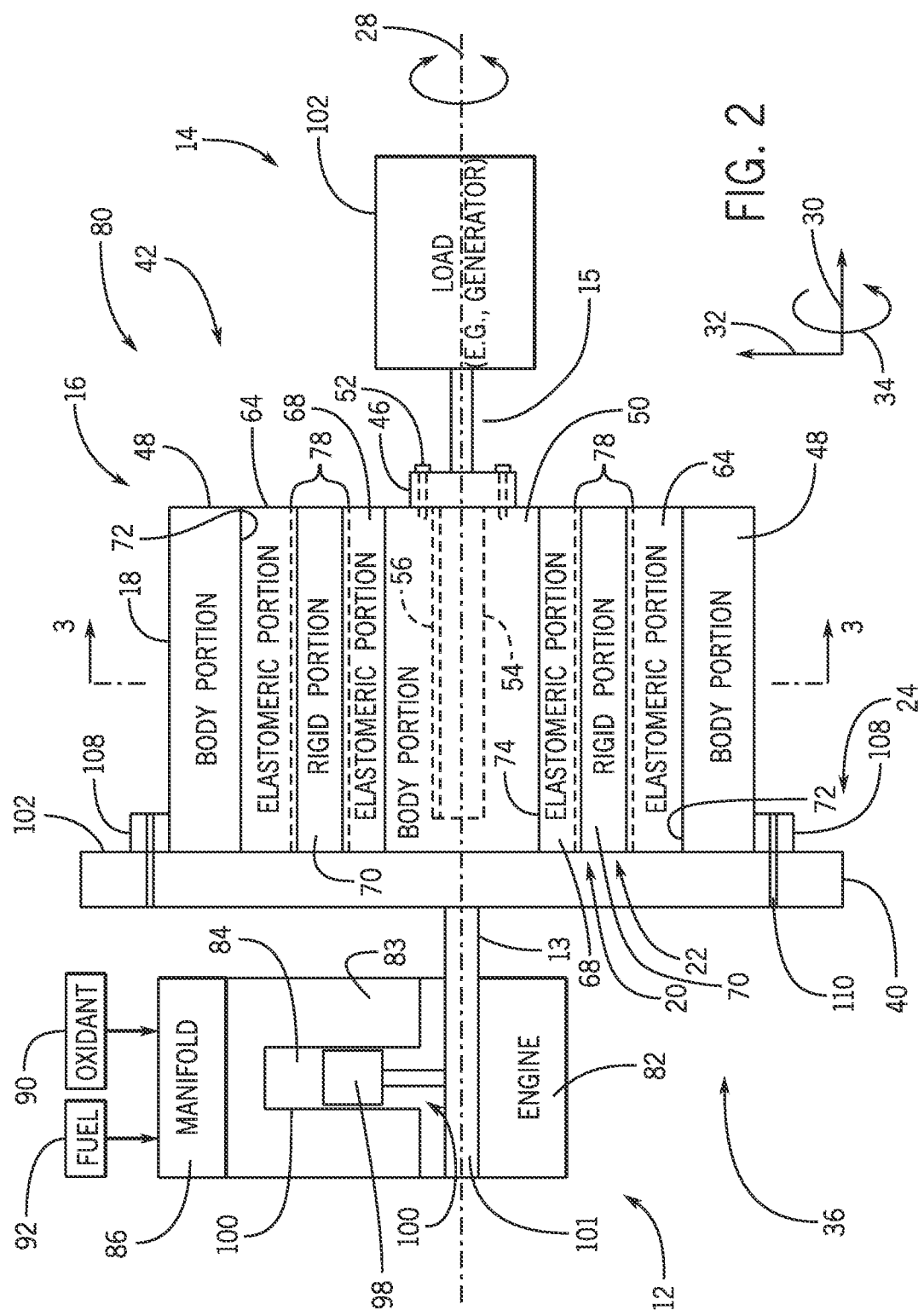
FIG. 2 is a block diagram of an embodiment of an engine-generator system having the flexible in-shear coupling of FIG. 1.

FIG. 2 illustrates a block diagram of an embodiment of a portion of an engine driven power generation system 80 having a reciprocating internal combustion engine 82, which may provide the rotational output (e.g., torque) to the second machine 14 via the rotational coupling 16. The system 80 includes the engine 82 (e.g., a reciprocating internal combustion engine) having one or more combustion chambers 84 (e.g., 1, 2, 3, 4, 5, 6, 7, 8, 10, 12, 14, 16, 18, 20, 21, 22, 23, 24, or more combustion chambers 84) within an engine block and/or cylinder block 83. The engine 82 also includes an engine manifold 86 (e.g., intake manifold and exhaust manifold), which may be coupled to an oxidant supply 90 and a fuel supply 92. The oxidant supply 90 (e.g., an air supply) is configured to provide a pressurized oxidant 90, such as air, oxygen, oxygen-enriched air, oxygen-reduced air, or any combination thereof, to each combustion chamber 84. The fuel supply 92 is configured to provide a fuel 92 (e.g., liquid and/or gaseous fuel) to each combustion chamber 84. The fuel 92 may be any suitable gaseous fuel, such as natural gas, associated petroleum gas, propane, biogas, sewage gas, landfill gas, coal mine gas, for example. The fuel 92 may also include a variety of liquid fuels, such as gasoline or diesel fuel. During operation, each combustion chamber 84 combusts a mixture of the fuel 92 with oxidant 90 to generate hot pressurized combustion gases, which in turn cause a piston 98 adjacent to each combustion chamber 84 to move linearly within a cylinder 100. The reciprocating pistons 98, driven by combustion gases, in turn drive rotation of a crankshaft 101, which causing the first shaft 13 (e.g., an engine shaft) to rotate circumferentially 34 about the rotational axis 28.

Further, the first shaft 13 may be coupled to the rotational coupling 16 via a flywheel 102, which couples the first shaft 13 to the first side 36 of the rotational coupling 16. The first rotational joint 24 may include the flywheel 102, which may be an example of the hub 40 in FIG. 1. The first rotational joint 24 may include coupling features 108 on the coupling body 18 (e.g., outer body portion 48) of the rotational coupling 16, and these coupling features 108 may couple with complementary features on the flywheel 102 to secure the coupling body 18 to the flywheel 102. For example, the coupling features 108 may include an annular flange, a plurality of circumferentially spaced brackets, or a combination thereof, fixed to or integral with the outer body portion 48 of the coupling body 18. The coupling body 18 and the flywheel 102 may be secured by fasteners 110 (e.g., threaded fasteners, bolts, screws, snap-on, etc.) extending through receptacles in the coupling features 108 and the flywheel 102. In certain embodiments, the first side 36 of the coupling body 18 may abut a surface of the flywheel 102. In other embodiments, the first side 36 of the coupling body 18 may be spaced apart from the flywheel 102, such that the plurality of layers 22 within the annular opening 54 are not in direct contact with the flywheel 102. On the second side 42, second rotational joint 26 couples the inner body portion 50 to the second shaft 15 as described above with reference to FIG. 1. In the illustrated embodiment, the second shaft 15 is coupled to a load 102 (e.g., an electrical generator), which is driven by the engine 82 causing rotation of the first shaft 13, the rotational coupling 16, and the second shaft 15.

Figure 3:
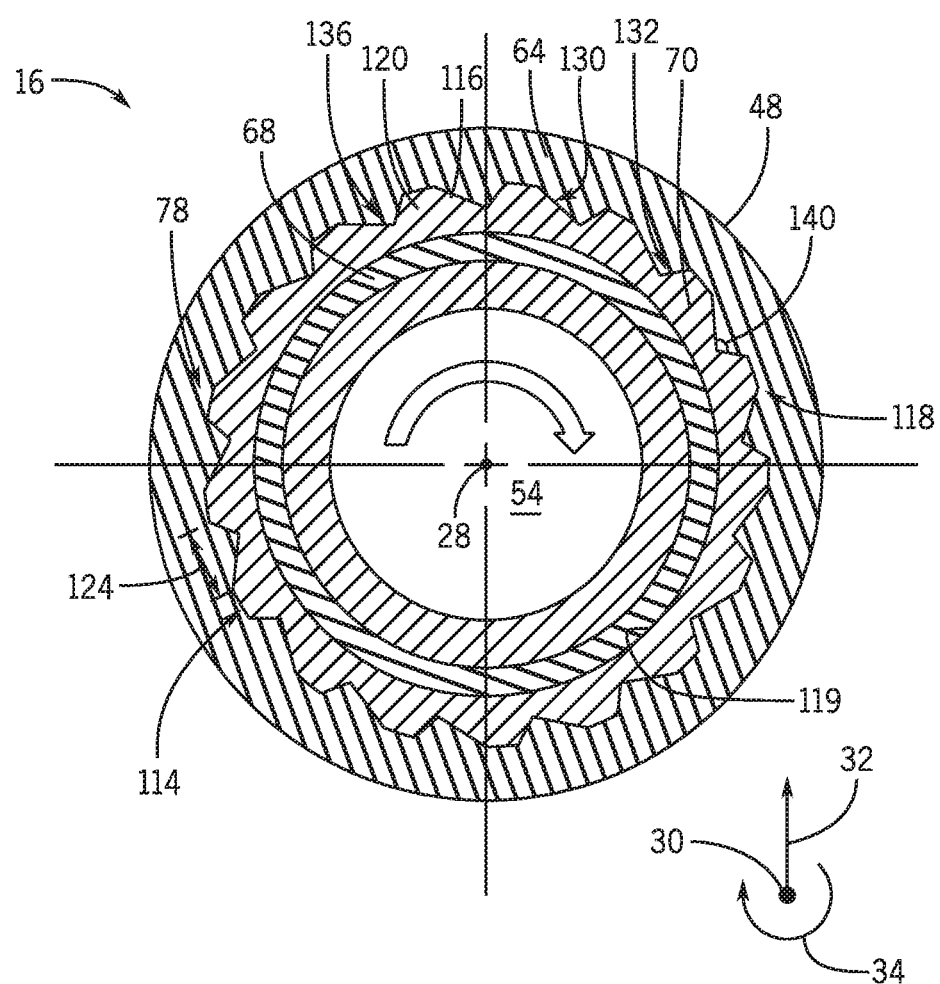
FIG. 3 is a cross-sectional side view of an embodiment of the flexible in-shear coupling of FIG. 1 taken along line 3-3, wherein the rigid layer includes a toothed interleaf.

As discussed above, the rigid portion 70 of the rotational coupling 16 includes the surface features 78 shaped to load shear stress sensitive areas of the elastomeric portions 64, 68 in compression, rather than in shear. FIG. 3 is a cross-sectional side view of the rotational coupling 16 of FIGS. 1 and 2, taken within line 3-3, illustrating the surface features 78 of the rigid portion 70. In the illustrated embodiment, the surface features 78 are disposed along an outer perimeter 114 of the rigid portion 70. For example, the rigid portion 70 includes a plurality of teeth 116 (e.g., radial protrusions) positioned radially outward 32 away from the rotational axis 28 in a direction from the inner body portion 50 toward the outer body portion 48. Accordingly, the plurality of teeth 116 is positioned at an interface 118 (e.g., a toothed annular interleaf) between the elastomeric portion 64 and the rigid portion 70. In certain embodiments, for example when the hub 40 is coupled to the inner body portion 50, the plurality of teeth 116 may extend radially inward toward the rotational axis 28 in a direction away from the outer body portion 48 toward the inner body portion 50, such that the plurality of teeth 116 is at an interface 119 (e.g., toothed annular interleaf) between the elastomeric portion 68 and the rigid portion 70.

Figure 4:
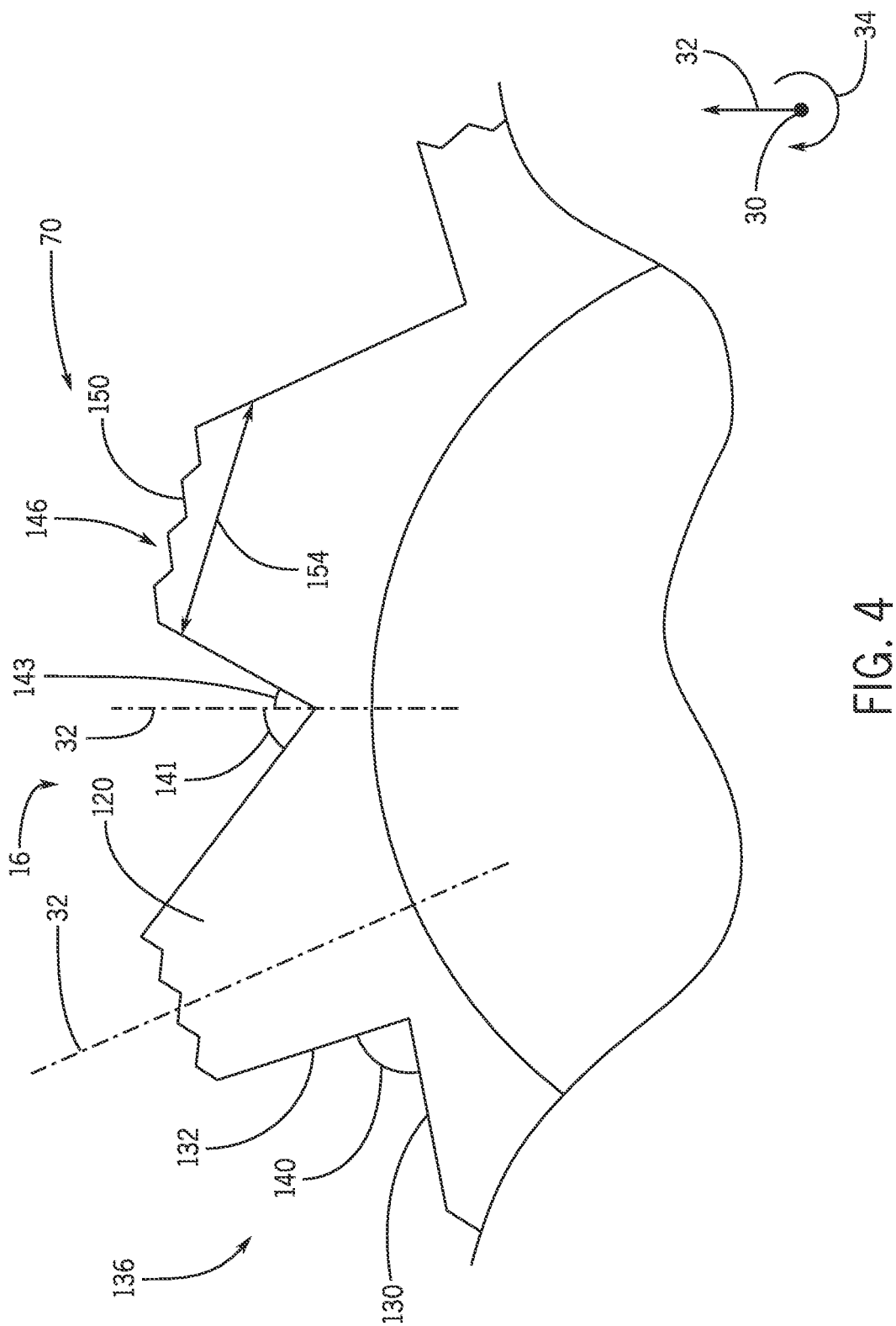
FIG. 4 is a partial cross-sectional side view of an embodiment of the toothed interleaf of FIG. 3, wherein the toothed interleaf includes asymmetrical teeth.
Figure 5:
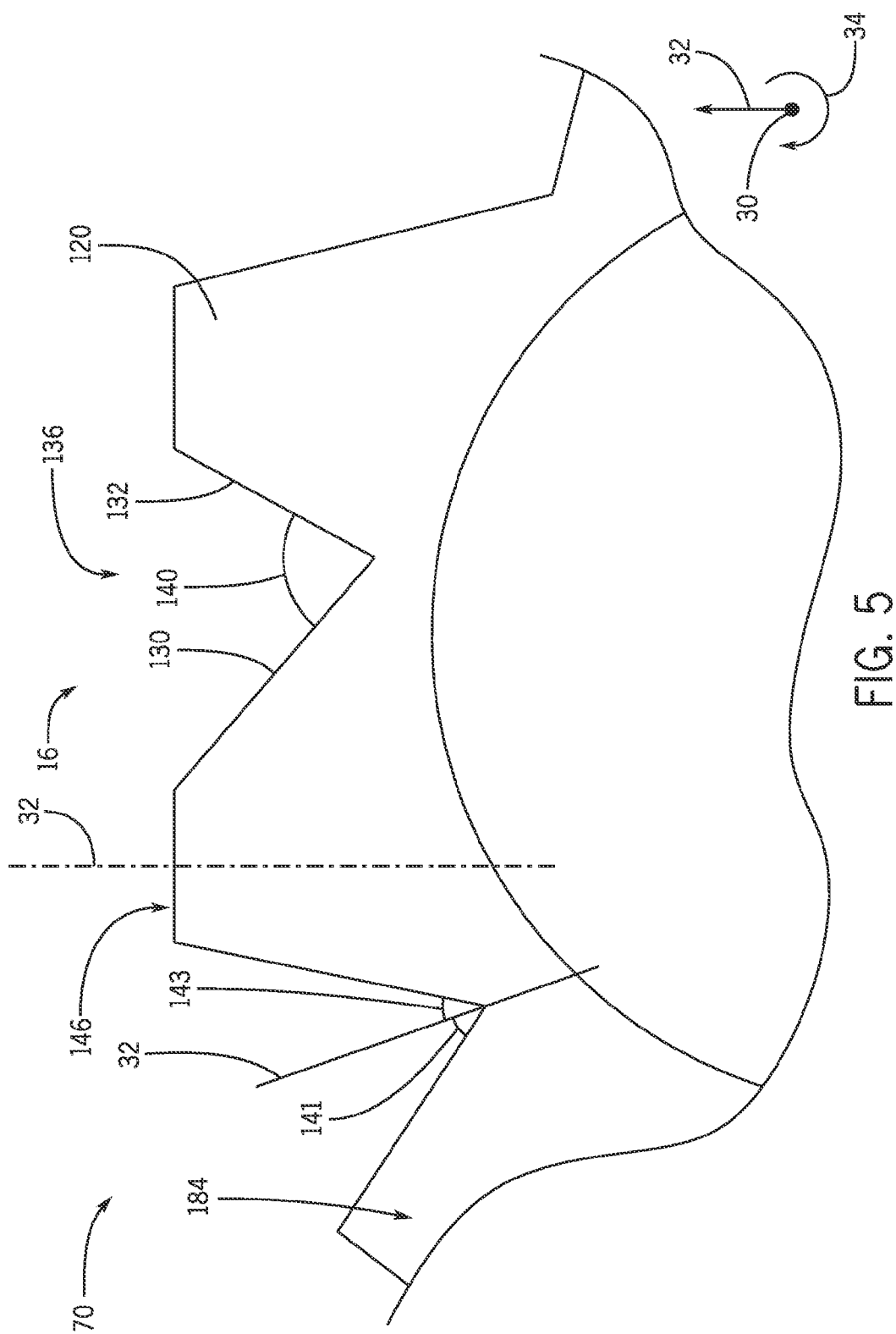
FIG. 5 is a partial cross-sectional side view of an embodiment of the toothed interleaf of FIG. 3, wherein the toothed interleaf includes a textured surface.
Figure 6:
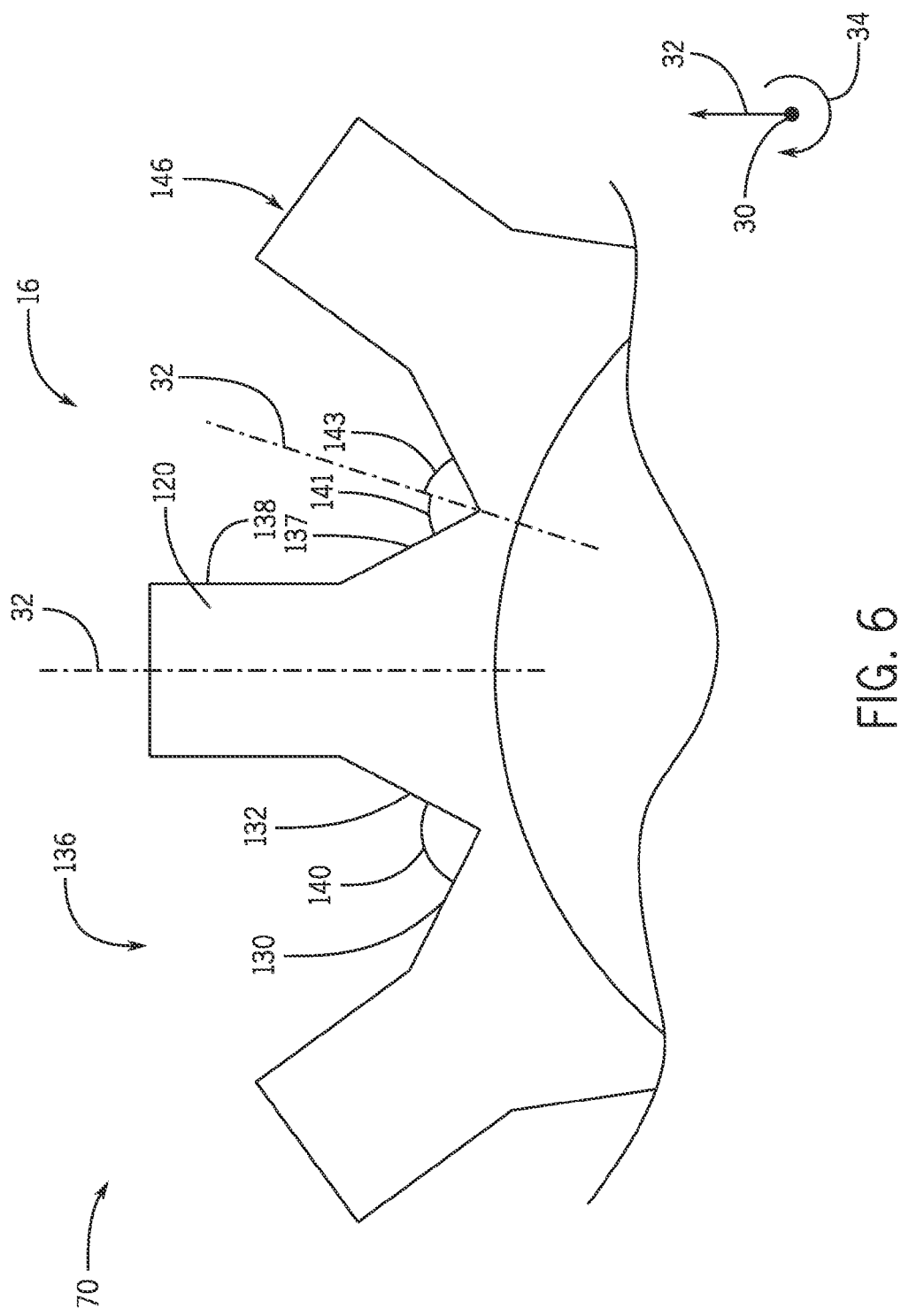
FIG. 6 is a partial cross-sectional side view of an embodiment of the toothed interleaf of FIG. 3, wherein the toothed interleaf includes symmetrical teeth having an inverted Y-shape.
Figure 7:
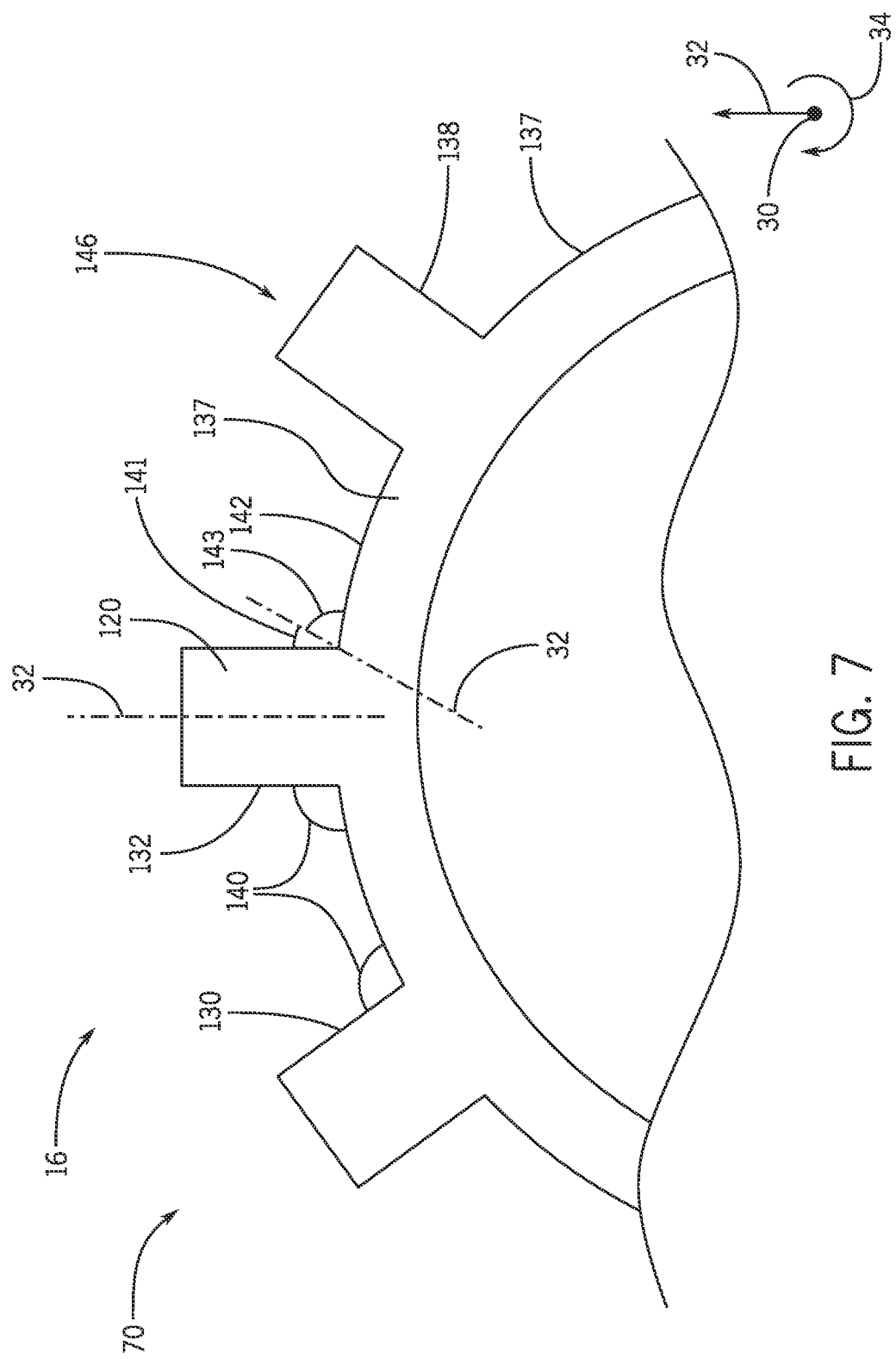
FIG. 7 is a partial cross-sectional side view of an embodiment of the toothed interleaf of FIG. 3, wherein the toothed interleaf includes symmetrical teeth having an inverted T-shape.

Each tooth 120 of the plurality of teeth 116 on the outer perimeter 114 of the rigid portion 70 is circumferentially 34 spaced apart a distance 124 from an adjacent tooth 120. The plurality of teeth 116 has a first slope 130 and a second slope 132 opposite the first slope 130. The slopes 130, 132 create a plurality of recesses 136 that separates each tooth 120 from an adjacent tooth 120. In the illustrated embodiment, the slopes 130, 132 extend at angles circumferentially 34 about the axis 28, 30 and converge away from the outer body portion 48 in a direction toward the rotational axis 28, thereby forming the plurality of recesses 136 between each pair of adjacent teeth 120 of the plurality of teeth 116. That is, the first slope 130 is in a first circumferential direction (e.g., rotational direction 36) about the axis 28, 30 and the second slope 132 is in a second circumferential direction about the axis 28, 30 opposite the first circumferential direction. The slopes 130, 132 may be variable or the same along the outer perimeter 114 depending on the desired shape and symmetry of the plurality of teeth 116. In one embodiment, the first slope 130 is greater than the second slope 132, such that each tooth 120 of the plurality of teeth 116 has an asymmetrical shape relative to the radial axis 32 through the one tooth 120, as illustrated in FIGS. 4 and 5. In other embodiments, the slopes 130, 132 are approximately equal, such that the plurality of teeth 116 has a symmetrical shape relative to the radial axis 32, as illustrated in FIGS. 6 and 7. For example, each tooth 120 in the embodiment of FIG. 6 has an inverted-Y shape, which includes an angled base portion 137 (e.g., diverging or converging base portion) and a straight tip portion 138 (e.g., rectangular tip portion). By further example, each tooth 120 in the embodiment of FIG. 7 has an inverted-T shape or an I-shape, which includes an arcuate base portion 137 and a straight tip portion 138 (e.g., rectangular tip portion). In certain embodiments, a portion of the plurality of teeth 116 has an asymmetrical shape relative to the radial axis 32, and another portion of the plurality of teeth has a symmetrical shape relative to the radial axis 32. The slope 130 of one tooth 120 and the slope 132 of an adjacent tooth 120 may form one or more angles 140 between each tooth 120. For example, the one or more angles 140 may be disposed between the slopes 130, 132 (as illustrated in FIGS. 4-6) or may be between the slope 130, 132 and an innermost outer perimeter 142 of the rigid portion 70 (as illustrated in FIG. 6). The angle 140 may be equal to or greater than approximately 90 degrees, e.g., 90, 100, 115, 120, 135, 145, or more.

The slopes 130, 132 may each form an acute angle 141, 143, respectively, relative to the radial axis 34. The acute angles 141, 143 (e.g., less than 90 degrees) may be the same or different relative to one another. For example, in certain embodiments, the angle 141 is equal to or greater than the angle 143. In other embodiments, the angle 141 is equal to or less than the angle 143. The acute angles 141, 143 may be any angles between approximately 1 degree and approximately 90 degrees. For example, 1, 5, 10, 15, 20, 25, 30, 35, 40, 45, 65, 75, and 85. As should be noted, a sum of the angles 141, 143 is approximately equal to the angle 140.

In one embodiments, a tooth tip 146 (e.g., outermost radial perimeter of the rigid portion 70) may be flat (e.g., smooth or non-contoured), as illustrated in FIGS. 5-7. In other embodiments, the tooth tip 146 may be variably textured or contoured, as illustrated in FIG. 4. For example, the tooth tip 146 may have a plurality of slopes 150 forming recesses and protrusions across at least a portion of a length 154 of the tooth 120. In certain embodiments, the rigid portion 70 may include a combination of flat and contoured tooth tips 146.

Figure 8:
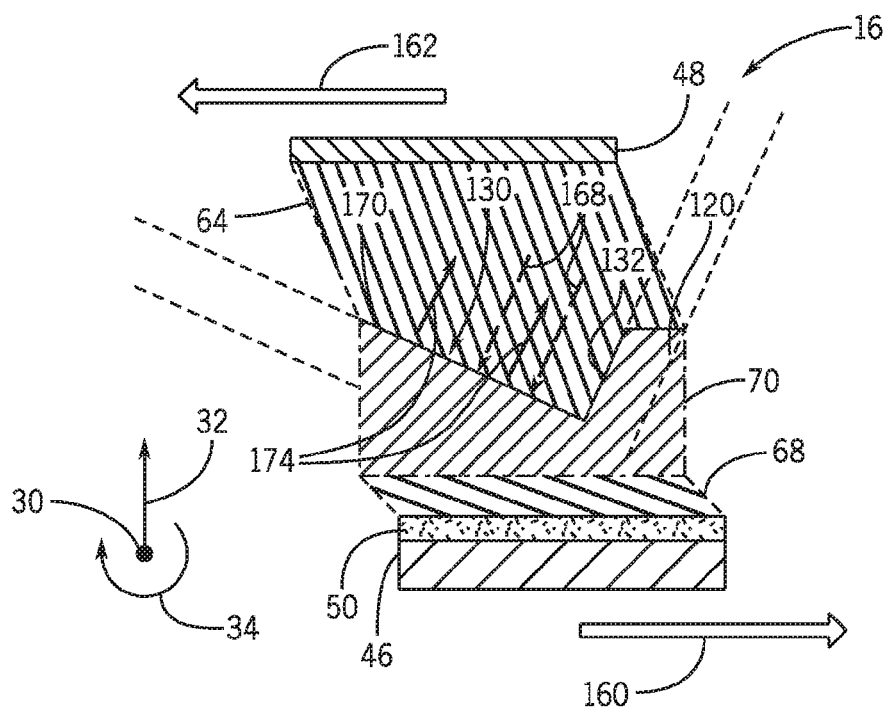
FIG. 8 is a side view of an embodiment of the flexible in-shear coupling of FIG. 1, wherein one of the resilient layers is loaded in compression in a drive direction.
Figure 9:
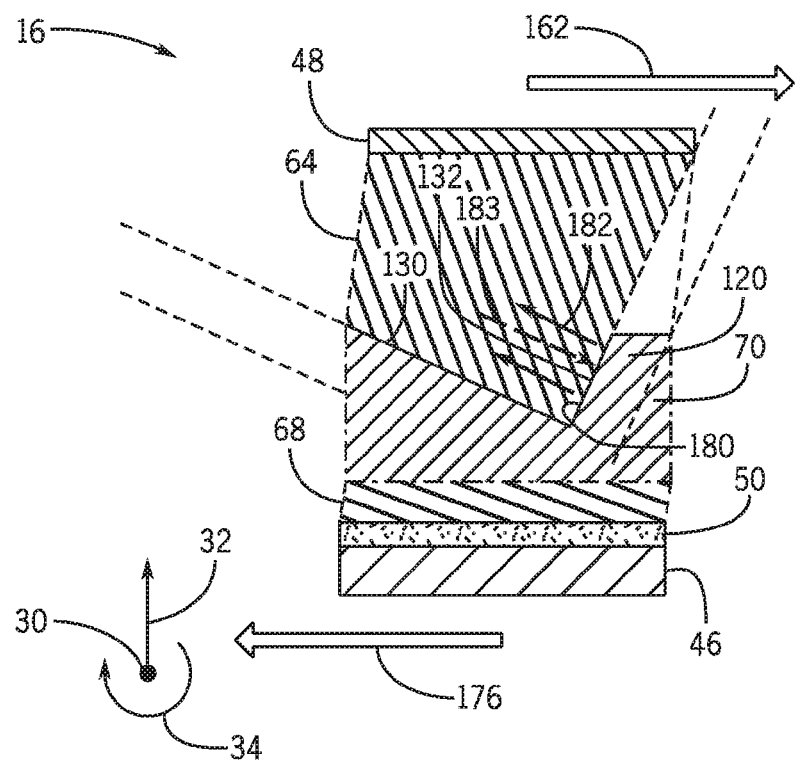
FIG. 9 is a partial cross-sectional side view of an embodiment of the flexible in-shear coupling of FIG. 1, wherein one of the resilient layers is loaded in compression in a reverse drive direction.

As discussed above, the rigid portion 70 loads the shear stress sensitive areas in compression. FIGS. 8 and 9 illustrate a portion of the shear stress sensitive area of the rotational coupling 16 loaded in compression by the rigid portion 70. For example, during operation of the system 10 in a drive direction 160 (e.g., clockwise rotation about the rotational axis 28), shear loading 162 on the first elastomeric portion 64 is in a direction substantially opposite to the drive direction 160. As the first elastomeric portion 64 stretches and twists in the direction of the shear loading 162, the first elastomeric portion 64 exerts a first force 168 on the rigid portion 70 in a direction away from the outer body portion 48 and toward a first tooth surface 170 corresponding to the slope 130 of the plurality of teeth 116. Similarly, a first tooth surface 170 exerts a second force 174 against the first elastomeric portion 64 radially outward 32 in a direction away from the first tooth surface 170 and toward the outer body portion 48. As such, the forces 168, 174 are orthogonal to the first tooth surface 170 and substantially opposite to each other. In this way, the rigid portion 70 (e.g., the first tooth surface 170) locally loads the first elastomeric portion 64 in compression along the circumferential direction 34 about the rotational axis 28, thereby relieving the shear stress on the first elastomeric portion 64 caused by the shear loading 162. That is, the plurality of teeth 116 load the first elastomeric portion 64 radially in compression, rather than radially in shear compared to conventional flexible in-shear couplings that do not include the rigid portion 70.

During reverse mode operation of the system 10, 80, the shear loading 162 is in a direction opposite a reverse drive direction 176. Similar to the first tooth surface 170, a second tooth surface 180 corresponding to the slope 132 exerts a third force 182 on the elastomeric portion 64 radially outward 32 in a direction away from the second tooth surface 180 and toward the outer body portion 48. Similarly, the first elastomeric portion 64 exerts a fourth force 183 on the rigid portion 70 in a direction away from the outer body portion 48 and toward the second tooth surface 180 corresponding to the slope 132 of the plurality of teeth 116. As such, the forces 182, 183 are orthogonal to the second tooth surface 180 and substantially opposite to each other. Accordingly, the second tooth surface 180 loads the first elastomeric portion 64 in compression, as discussed above, decreasing the shear stress caused by the shear loading 162 compared to flexible couplings that do not include the rigid portion 70. In certain embodiments, slopes 130, 132 are substantially orthogonal, and thus the third force 182 is substantially orthogonal to the second force 174. In embodiments where the tooth tip 146 includes the plurality of slopes 150 (as shown in FIG. 4), the plurality of slopes 150 may further reduce shear stress from the shear loading 162 in a similar manner. The slopes 130, 132 of the tooth 120 that are at an increased angle result in an increased reaction force that may be advantageous in managing load reversals that may be damaging to the elastomeric element of an elastomer-in-shear coupling.

Additionally, the conductivity of the rigid portion 70 may dissipate the heat throughout the elastomeric portions 64, 68, which may have a low thermal conductivity (e.g., approximately 0.15 Watt/(meter Kelvin) (W/(mK)) compared to the thermal conductivity of the rigid portion 70. The rigid portion 70 may have a thermal conductivity that is at least 1.5 times greater, or up to in-excess of 1000 times greater than the thermal conductivity of the elastomer portions 64, 68. For example, in certain embodiments, the rigid portion 70 may have a thermal conductivity of between approximately 0.25 W/(mK) and approximately 205 W/(mK) depending on the material used to fabricate the rigid portion 70. Therefore, by dissipating the heat and loading the shear force (e.g., the shear loading 162) in compression, the rigid portion 70 may increase the durability of the elastomeric portions 64, 68 in flexible in-shear couplings, such as the rotational coupling 16. For example, in certain embodiments, the rotational coupling 16 may enable the systems 10, 80 to operate for greater than typical (e.g., above approximately 20,000 hours for a reciprocating gas engine) before replacing the rotational coupling 16. As such, the operational and maintenance costs associated with flexible in-shear couplings that include a rigid portion 70 may be decreased.

Moreover, the improved durability of the rotational coupling 16 may increase the overall performance and reliability of the system 10, 80 compared to systems that do not include flexible in-shear couplings having the disclosed rigid portion 70.

Figure 10:
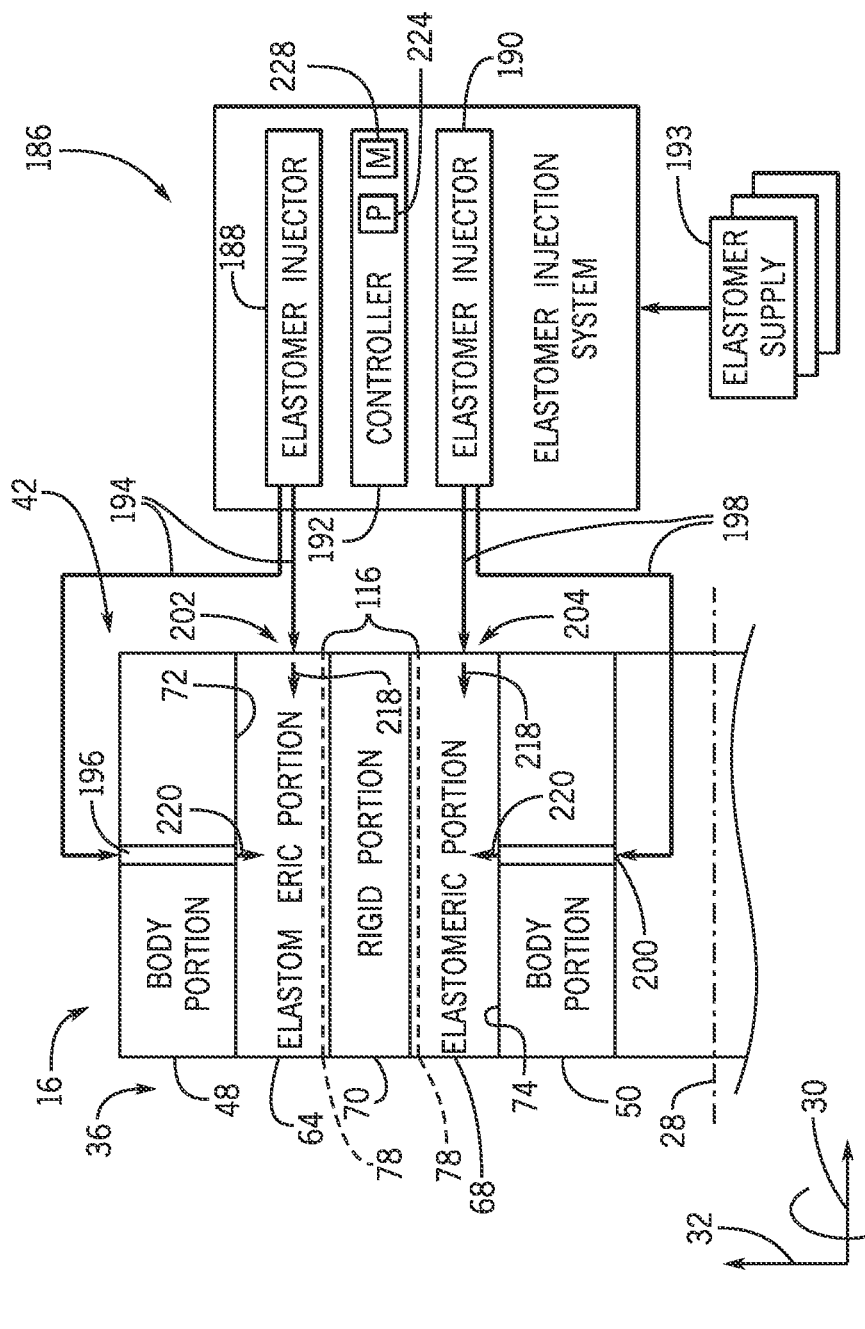
FIG. 10 is a block diagram of an embodiment of an elastomer injection system, wherein the elastomer injection system injects an elastomer into an annular region of the flexible in-shear coupling to generate the resilient layers and secure the toothed interleaf.

As discussed in further detail below, with reference to FIGS. 10 and 11, the rotational coupling 16 may be manufactured via injection molding, overmolding, or any other suitable manufacturing techniques, and combinations thereof. For example, to facilitate coupling the rigid portion 70 to the rotational coupling 16, the rigid portion 70 may be overmolded in place with the elastomeric portions 64, 68 between the inner and outer body portions 48, 50. The rigid portion 70 may include features to enable bonding (e.g., adherence) of the elastomeric portions 64, 68 to surfaces of the rigid portion 70 and the inner and outer body portions 48, 50. In certain embodiments, at least a portion of the rigid portion 70 may include a textured surface 184 to increase a surface area of the rigid portion 70, and facilitate bonding (e.g., adhering) of the elastomeric portions 64, 68 to surfaces of the rigid portion 70. By way of example, one or more surfaces of the rigid portion 70 (including the surface features 78) may be grit blasted, etched, sanded, or otherwise texturized to generate the textured surface 184. In addition, one or more surfaces of the rigid portion 70 (including the surface features 78) may include a plurality of recesses (e.g., a pattern of cylindrical, rectangular, or crisscrossing recesses) to generate the textured surface 184. The textured surface 184 may be on any surface of the rigid portion 70 in contact with the elastomeric portions 64, 68. In certain embodiments, surfaces 72, 74 of the body portions 48, 50 may also be texturized in a similar manner to increase a surface area of the surfaces 72, 74, and bonding of the elastomeric portions 64, 68 to the body portions 48, 50.

During manufacturing, the resilient material (e.g., elastomeric material) of each respective elastomeric portion 64, 68 may be injected into the annular space 62 between the body portions 48, 50. For example, FIGS. 10 and 11 illustrate an elastomer injection system 186 that may be used to generate the rotational coupling 16. The system 186 includes first and second elastomer injectors 188, 190, respectively, and a system controller 192. While the illustrated embodiment includes two elastomer injectors 188, 190, the system 186 may include any suitable number of elastomer injectors 188, 190. For example, the system 186 may include 1, 2, 3, 4, 5 or more elastomer injectors 188, 190. The elastomer injectors 188, 190 may each be fluidly coupled to one or more elastomer supply units 193. The elastomer supply units 193 may supply each elastomeric injector 188, 190 with the same or a different resilient material (e.g., elastomeric material). As illustrated, the first elastomer injector 188 may inject a first desired elastomer 194 from the one or more elastomer supply units 193 through one or more first radial injection openings 196 (e.g., radial ports or passages) through the outer body portion 48 and/or through one or more first axial injection openings 202 (e.g., axial ports or passages) on one or both sides 36, 42. Similarly, the second elastomer injector 190 may inject a second desired elastomer 198 through one or more second radial injection openings 200 (e.g., radial ports or passages) through the inner body portion 50 and/or through one or more second axial injection openings 204 (e.g., axial ports or passages) on one or both sides 36, 42. The openings 196, 200, 202, and 204 may be spaced apart from one another in a circumferential direction 34 about the axis 28, 30. In this way, the elastomer injectors 188, 190 may inject the elastomers 194, 198 at multiple regions of the annular space 62. Accordingly, the elastomers 194, 198 may uniformly fill annular passages 202, 204 defined by the inner surfaces 72, 74 and a respective surface of the rigid portion 70, thereby forming the elastomeric portions 64, 68.

Figure 11:
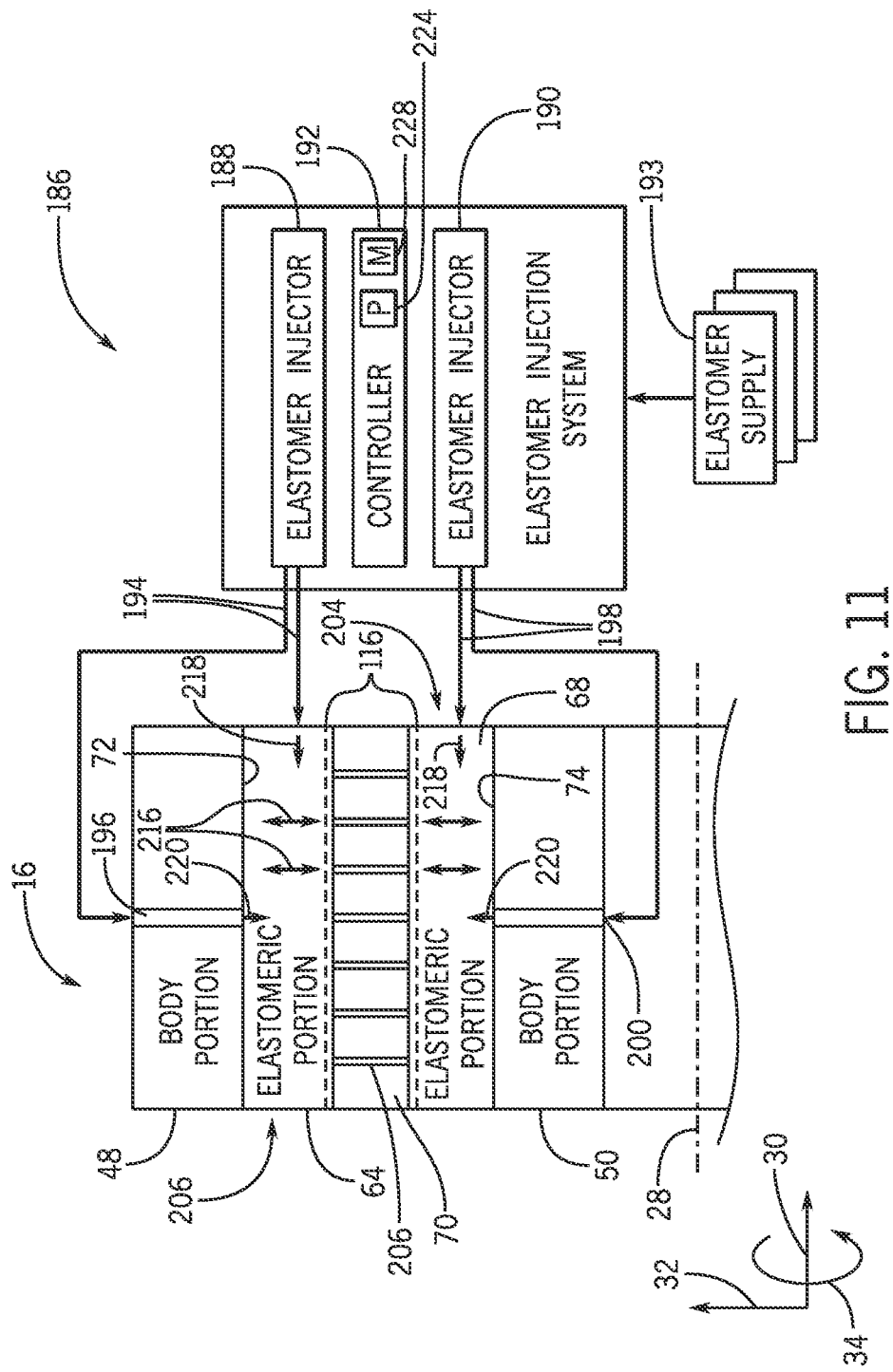
FIG. 11 is a block diagram of an embodiment of the elastomer injection system of FIG. 10, wherein the injected elastomer flows through radial passages through the toothed interface and connects the resilient layers disposed on each side of the toothed interface.
Figure 12:
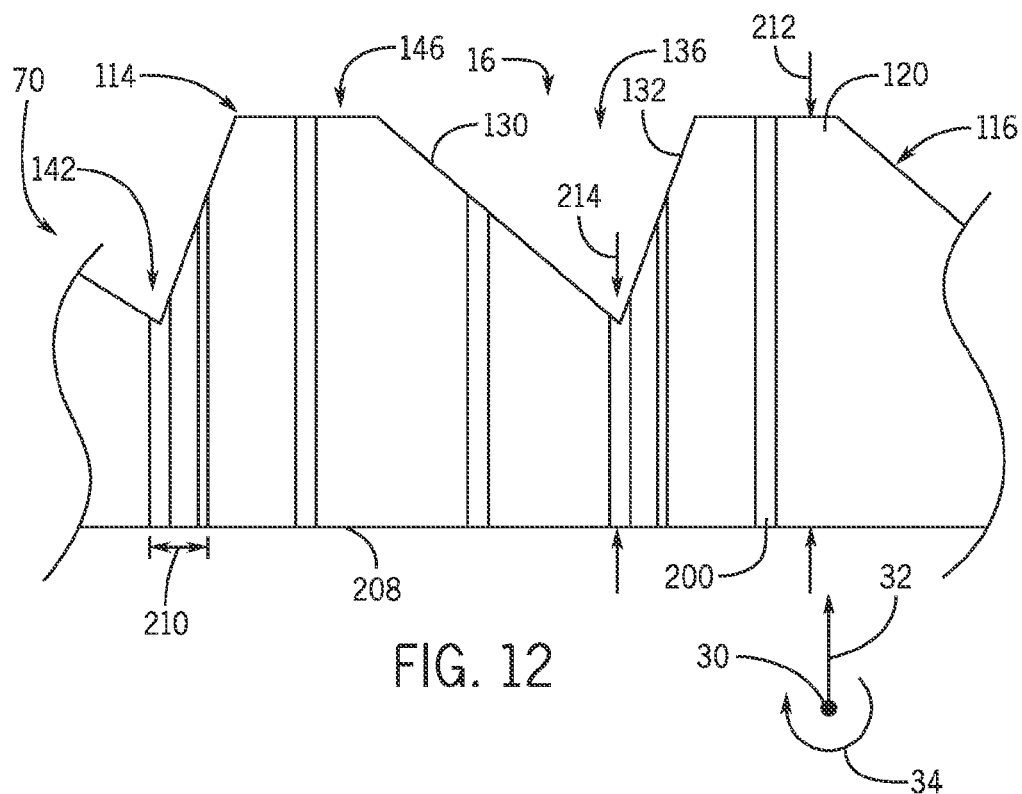
FIG. 12 is a partial cross-sectional side view of an embodiment of the toothed interface of FIG. 3, wherein the toothed interface includes a plurality of radial passages extending through a radial dimension of the toothed interface.

Additionally, in certain embodiments, at least one or both of the elastomers 188, 190 flow through one or more radial passages 206 (e.g., internal passages) disposed through the rigid portion 70, as illustrated in FIG. 11. The radial passages 206 may connect the elastomeric portions 64, 68, and provide additional support to retain the rigid portion 70 within the annular space 62 of the rotational coupling 16. As illustrated in FIG. 12, the radial passages 206 extend through the rigid portion 70 between an inner perimeter 208 and the outer perimeters 114, 142. The one or more radial passages 206 may be spaced apart from one another (e.g., by a distance 210) in the circumferential direction 34 about the axial axis 28, 30 as illustrated in FIG. 12, and may be spaced apart from one another in the axial direction 30 as illustrated in FIG. 11. That is, the rigid portion 70 may have multiple rows and columns of the one or more radial passages 206 in the circumferential and axial directions 32, 30. In certain embodiments, the one or more radial passages 206 may be located in the thickest portions (e.g., first radial dimension 212), thinnest portions (e.g., second radial dimension 214), and/or intermediate thickness portions (e.g., between dimensions 212, 214) of the rigid portion 70, such as defined by the plurality of teeth 116. As illustrated, the first radial dimension 212 is greater than the second radial dimension 214. In some embodiments, the one or more radial passages 206 may be located only in the thickest portions (e.g., first radial dimension 212) of the rigid portion 70. In any or all of these locations, the elastomers 194, 198 may extend partially or completely through the one or more radial passages 206 (as illustrated by arrows 216 in FIG. 11), thereby connecting the elastomer portions 64, 68. Therefore, the elastomers 194, 198 may reinforce and secure the rigid portion 70 to the rotational coupling 16.

In one embodiment, the portions 64, 68 may have a common elastomer 194, 198. That is, the elastomers 194, 198 may have substantially identical chemical and physical properties. In other embodiments, the elastomeric portions 64, 68 may have elastomers 194, 198 having different chemical and physical properties. For example, the elastomer 194 supplied to the first elastomeric portion 64 may have a greater torsional softness (or lesser hardness) compared to the elastomer 198 supplied to the second elastomeric portion 68. This may be due, in part, to the higher shear loading 162 on the first elastomeric portion 64 compared to the second elastomeric portion 68. For example, the increased torsional softness of the elastomer 194 in the first elastomeric portion 64 compared to the elastomer 198 in the second elastomeric portion may facilitate shear torque transfer from the first shaft 13 to the second shaft 15, as discussed above with reference to FIGS. 1 and 2. Alternatively, the elastomer 194 supplied to the first elastomeric portion 64 may have a lesser torsional softness (or greater hardness) compared to the elastomer 198 supplied to the second elastomeric portion 68. For example, the elastomer 198 may be at least 1.1, 1.2, 1.3, 1.4, 1.5, 1.6, 1.7, 1.8, 1.9, 2, 2.5, 3, 4, 5, 6, 7, 8, 9, 10, or more times stiffer or harder than the elastomer 194, or vice versa, using a unit of measure such as Young's modulus or Shore's durometer.

The system controller 192 commands operation of the elastomeric injection system 186 to inject a desired amount of the elastomer 194, 198 into the annular passages 202, 204, as illustrated by arrows 218, 220. For example, the system controller 192 may include devices employing a general purpose or an application-specific processor 224, both of which may include memory circuitry 228 for storing data relating to elastomer flow rates, flexible coupling dimensions (e.g., annular space, annular passage, and rigid portion dimensions, number of radial passages 206, etc.), and elastomer properties (e.g., viscosity, density, stiffness, softness, damping, cure times, etc). The system controller 192 may include, or couple with, a variety of user interfaces, such as a display or monitor, a keyboard, a mouse, and a printer for generating hard copy output of injection, coupling, and/or elastomer parameters and images of the rotational coupling 16.

Figure 13:
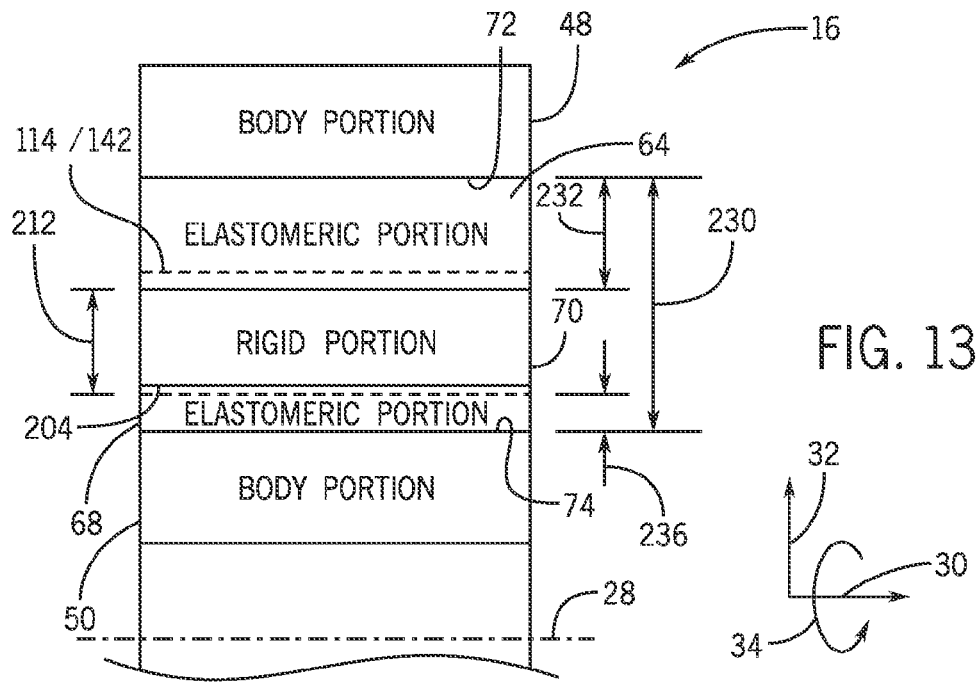
FIG. 13 is a block diagram of an embodiment of the flexible in-shear coupling of FIG. 3, wherein the resilient layers have a variable radial dimension.

In certain embodiment, the system controller 192 may control injection of the elastomers 194, 198 based on material properties of the elastomers 194, 198 and a dimension of the elastomer portions 64, 68 and the rigid portion 70. For example, as illustrated in FIG. 13, the annular space 62 of the rotational coupling 16 has a radial dimension 230 radially 32 extending between the body portions 48, 50. As discussed above, the annular space 62 includes the elastomeric portions 64, 68 and the rigid portion 70. The rigid portion 70 includes the radial dimension 212 radially 32 extending between the first outer perimeter 114 and the inner perimeter 208. Similarly, the elastomeric portions 64, 68 include radial dimensions 232, 236, respectively. The radial dimension 232 extends radially 32 between the first inner surface 72 of the outer body portion 48 and the perimeter 114 or 142. The radial dimension 236 extends radially 32 between the second inner surface 74 of the inner body portion 50 and the inner perimeter 208 of the rigid portion 70.

The radial dimensions 232, 236 may be the same or different. In certain embodiments, the radial dimension 232 may be greater than the radial dimension 236, thereby providing a greater stiffness in the elastomer portion 68 relative to the elastomer portion 64. In other embodiments, the radial dimension 232 may be lesser than the radial dimension 236, thereby providing a greater stiffness in the elastomer portion 64 relative to the elastomer portion 68. For example, the radial dimension 232 may be at least 5, 10, 15, 20, 25, 30, 35, 40, 45, 50, 75, 100, 150, 200, 250, or 300 percent greater than the radial dimension 236, or vice versa. In certain embodiments, the controller 192 may calculate the radial dimensions 232, 236 to achieve a desired stiffness in the elastomer portions 64, 68, or the controller 192 may calculate the desired material composition (e.g., Young's modulus) of the elastomers 194, 198 to achieve a desired stiffness in the elastomer portions 64, 68, or a combination thereof. Therefore, the controller 192 may control the selection and/or mixing of elastomeric materials to help achieve a desired stiffness in the elastomer portions 64, 68. The controller 192 also may calculate a volume of the elastomers 194, 198 to be injected into the elastomeric portions 64, 68, and the controller 192 may increase and or decrease a flow rate, pressure, and/or temperature of the elastomers 194,198 injected into the respective elastomeric portion 64, 68 based on the radial dimensions 232, 236. In certain embodiments, the controller 192 may adjust the flow rate of the elastomers 194, 198 to complete the injection into the respective elastomeric portion 64, 68 simultaneously regardless of differences in the radial dimensions 232, 236.

As discussed above, certain embodiments of the rotational coupling 16 include multiple layers 22 radially extending between the outer body portion 48 and the inner body portion 50. The multiple layers include the elastomeric portions 64, 68 and the rigid portion 70. The rigid portion 70 includes the plurality of teeth 116 and recess 136 (e.g., slopes 130, 132) that load the shear forces (e.g., shear loading 162) in compression, rather than in shear, during torque transfer between the rotating shafts 13, 15. The first elastomeric portion 64 may include an elastomer (e.g., the elastomer 194) having a greater torsional softness (or lesser stiffness) compared to the elastomer (e.g., the elastomer 198) in the second elastomeric portion 68. The elastomers 194, 198 may be compound tuned such that the elastomeric portions 64, 68 maintain a torsional softness similar to a flexible coupling that does not include the rigid portion 70. By including a rigid portion having a plurality of teeth, such as the rigid portion 70, the durability of the flexible in-shear couplings may be increased by loading areas sensitive to shear stress in compression, rather than in shear. In this way, the overall operational and maintenance costs of the system 10, 80 may be decreased, and system reliability may be increased for the system 10, 80 (e.g., power generation system).

This written description uses examples to disclose embodiments of the present disclosure, including the best mode, and also to enable any person skilled in the art to practice the disclosed embodiments, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for coupling machinery, comprising:
   a rotational coupling, comprising:
      a first rotational joint;
      a second rotational joint; and
      a coupling body disposed between the first and second rotational joints, wherein the coupling body comprises first and second body portions disposed about a rotational axis, and a layered portion disposed about the rotational axis radially between the first and second body portions, wherein the layered portion comprises first and second elastomeric portions disposed about the rotational axis, and a rigid portion disposed about the rotational axis radially between the first and second elastomeric portions, wherein the rigid portion comprises a toothed annular interleaf having a plurality of radial protrusions, and wherein the plurality of radial protrusions are spaced apart from one another circumferentially about the toothed annular interleaf, and wherein at least one radial protrusion of the plurality of radial protrusions has an asymmetrical shape relative to a radial axis through the at least one radial protrusion.

2. The system for coupling machinery of claim 1, wherein the rigid portion comprises one or more openings extending into the rigid portion between an inner perimeter and an outer perimeter.

3. The system for coupling machinery of claim 2, wherein an elastomeric material of at least one of the first or second elastomeric portions extends into the one or more openings.

4. The system for coupling machinery of claim 2, wherein the first and second elastomeric portions comprise a common elastomeric material that extends through the one or more openings connecting the first and second elastomeric portions.

5. The system for coupling machinery of claim 1, wherein the plurality of radial protrusions is disposed along an outer perimeter of the toothed annular interleaf.

6. The system for coupling machinery of claim 1, wherein at least one radial protrusion of the plurality of radial protrusions has a first slope in a first circumferential direction about the rotational axis and a second slope in a second circumferential direction about the rotational axis, wherein the first slope is greater than the second slope.

7. The system for coupling machinery of claim 1, wherein the rigid portion comprises a metal, composite material, glass-filled nylon, or a combination thereof.

8. The system for coupling machinery of claim 1, wherein the first elastomeric portion comprises a first elastomeric material, the second elastomeric portion comprises a second elastomeric material, and the first and second elastomeric materials are different from one another.

9. The system for coupling machinery of claim 1, wherein the first elastomeric portion comprises a first elastomeric material, the second elastomeric portion comprises a second elastomeric material, and the first and second elastomeric materials are the same as one another.

10. The system for coupling machinery of claim 1, wherein the first and second elastomeric portions comprise at least one of a rubber, a silicone, ethylene propylene diene, or a combination thereof.

11. The system for coupling machinery of claim 1, wherein the first elastomeric portion comprises a first elastomeric material having a first hardness, the second elastomeric portion comprises a second elastomeric material having a second hardness, and the first hardness is greater than the second hardness.

12. The system for coupling machinery of claim 1, wherein the first elastomeric portion comprises a first radial thickness, the second elastomeric portion comprises a second radial thickness, and the second radial thickness is less than the first radial thickness.

13. The system for coupling machinery of claim 1, comprising a flywheel coupled to the rotational coupling.

14. The system for coupling machinery of claim 1, comprising a reciprocating engine coupled to the rotational coupling.

15. The system for coupling machinery of claim 1, comprising an electrical generator coupled to the rotational coupling.

16. The system for coupling machinery of claim 1, wherein the plurality of radial protrusions comprise at least greater than two radial protrusions.

17. A system for coupling machinery, comprising:
a coupling, comprising:
  a central axis;
  an inner body portion disposed about the central axis;
  an outer body portion disposed about the inner body portion; and
  a layered portion disposed about the central axis radially between the inner and outer body portions, wherein the layered portion comprises inner and outer elastomeric portions disposed about the central axis, and a rigid portion disposed about the central axis radially between the inner and outer elastomeric portions, wherein the rigid portion comprises a plurality of radial protrusions interfacing with the outer elastomeric portion; and wherein each radial protrusion of the plurality of radial protrusions has a first slope in a first circumferential direction about the central axis and a second slope in a second circumferential direction about the central axis, wherein the first slope is greater than the second slope.

18. The system for coupling machinery of claim 17, wherein the rigid portion comprises one or more openings extending into the rigid portion between an inner perimeter and an outer perimeter.

19. The system for coupling machinery of claim 18, wherein the inner and outer elastomeric portions comprise a common elastomeric material that extends through the one or more openings connecting the inner and outer elastomeric portions.

20. A method of coupling machinery, comprising:
transferring torque through a layered portion of a rotational coupling between first and second machines, wherein the layered portion comprises first and second elastomeric portions disposed about a rotational axis, and a rigid portion disposed about the rotational axis radially between the first and second elastomeric portions, wherein the rigid portion comprises a plurality of radial protrusions; and wherein each radial protrusion of the plurality of radial protrusions has a first slope in a first circumferential direction about the rotational axis and a second slope in a second circumferential direction about the rotational axis, wherein the first slope is greater than the second slope.

21. A system for coupling machinery, comprising:
a rotational coupling, comprising:
  a first rotational joint;
  a second rotational joint; and
  a coupling body disposed between the first and second rotational joints, wherein the coupling body comprises first and second body portions disposed about a rotational axis, and a layered portion disposed about the rotational axis radially between the first and second body portions, wherein the layered portion comprises first and second elastomeric portions disposed about the rotational axis, and a rigid portion disposed about the rotational axis radially between the first and second elastomeric portions, wherein the rigid portion comprises a plurality of radial protrusions, wherein the rigid portion comprises one or more openings extending into the rigid portion between an inner perimeter and an outer perimeter.

* * * * *